(12) United States Patent
Sugimoto et al.

(10) Patent No.: US 9,363,412 B2
(45) Date of Patent: Jun. 7, 2016

(54) ACCELERATOR CIRCUIT AND IMAGE PROCESSING APPARATUS

(71) Applicants: Hideki Sugimoto, Kanagawa (JP); Akihiro Matsuoka, Kanagawa (JP); Shimpei Sonoda, Kanagawa (JP)

(72) Inventors: Hideki Sugimoto, Kanagawa (JP); Akihiro Matsuoka, Kanagawa (JP); Shimpei Sonoda, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/681,290

(22) Filed: Apr. 8, 2015

(65) Prior Publication Data
US 2015/0302283 A1    Oct. 22, 2015

(30) Foreign Application Priority Data
Apr. 18, 2014    (JP) .................................. 2014-086560

(51) Int. Cl.
G06F 15/00    (2006.01)
G06F 1/00    (2006.01)
G06K 1/00    (2006.01)
G06K 15/00    (2006.01)
H04N 1/32    (2006.01)
G06T 1/20    (2006.01)

(52) U.S. Cl.
CPC .............. *H04N 1/32561* (2013.01); *G06T 1/20* (2013.01)

(58) Field of Classification Search
USPC .................................................. 358/1.1–1.18
See application file for complete search history.

(56) References Cited

U.S. PATENT DOCUMENTS

| 2001/0008400 | A1* | 7/2001 | Moriwaki | G09G 5/393 345/534 |
| 2003/0095272 | A1 | 5/2003 | Nomizu | |
| 2011/0173416 | A1* | 7/2011 | Noda | G06F 9/3885 712/29 |
| 2012/0280909 | A1 | 11/2012 | Sugimoto | |

FOREIGN PATENT DOCUMENTS

| JP | 2002-211050 | 7/2002 |
| JP | 2013-239120 | 11/2013 |

* cited by examiner

*Primary Examiner* — Douglas Tran
(74) *Attorney, Agent, or Firm* — Harness, Dickey & Pierce, P.L.C.

(57) ABSTRACT

An accelerator circuit for an image processing apparatus includes a buffer circuit that temporarily stores image data obtained from N (N>1) data sources and an arithmetic circuit that performs a predetermined arithmetic operation on pixel data. The buffer circuit includes N buffer memories and N 2D registers associated with the respective N data sources, a control circuit, and a selector. Each buffer memory temporarily stores image data obtained from a corresponding one of the N data sources. Each 2D register temporarily stores pixel data, which is a part of image data stored in a corresponding one of the N buffer memories, of an area of a predetermined size. The selector is controlled by the control circuit so as to select, when pixel data is stored in one of the N 2D registers, the pixel data and send the pixel data to the arithmetic circuit.

10 Claims, 6 Drawing Sheets

ACCELERATOR CIRCUIT AND IMAGE PROCESSING APPARATUS

CROSS-REFERENCE TO RELATED APPLICATIONS

The present application claims priority to and incorporates by reference the entire contents of Japanese Patent Application No. 2014-086560 filed in Japan on Apr. 18, 2014.

BACKGROUND OF THE INVENTION

1. Field of the Invention

The present invention relates to an accelerator circuit for an image processing apparatus as well as to the image processing apparatus including the accelerator circuit.

2. Description of the Related Art

Processing an image using a dedicated hardware device generally reduces processing time as compared with processing the image using software executed by a general-purpose processor. With this in view, an accelerator circuit, which is a dedicated hardware device that performs a predetermined simple arithmetic operation, is used in some cases. In particular, use of an accelerator circuit yields considerable reduction in processing time when two-dimensional (hereinafter, "2D") filtering is to be applied to image data.

According to a technique disclosed in Japanese Laid-open Patent Application No. 2002-211050, a printer, which is an example of an image output apparatus, includes a CPU (central processing unit) that performs drawing processing using software and a drawing accelerator that performs high-speed drawing processing using hardware, for example. The CPU interprets a drawing command based on an output command fed from a host computer and causes the drawing accelerator to perform a drawing operation on a target area of the drawing command. The drawing operation is performed block by block from, for example, the first block of the target area. Simultaneously, the CPU performs the drawing operation on the target area of the drawing command block by block from, for example, the last block of the target area. The CPU completes the operation of the drawing command when a sum of the areas on which the operation of the drawing command is performed respectively by the drawing accelerator and by the CPU becomes equal to the target area of the drawing command. This technique allows providing an inexpensive image output apparatus, such as a printer, that outputs images by performing drawing operations simply and at high speeds.

An image processing apparatus according to Japanese Laid-open Patent Application No. 2013-239120 includes one or more processors that perform arithmetic operation on image data using software, one or more hardware accelerators that perform predetermined arithmetic operation on the image data, a memory unit, and a buffer control unit that controls writes and reads to and from the memory unit. Storage area of the memory unit is physically divided into buffer spaces, the number of which is equal to or greater than ((the number of the processors)+(the number of the hardware accelerators)−1). The buffer control unit controls a write and a read of image data to and from a corresponding buffer space of the buffer spaces in accordance with an access from each of the processors and the hardware accelerators. This configuration provides an image processing apparatus including an image processing circuit capable of changing arithmetic operations related to image processing flexibly as desired without increasing in a circuit size.

Some type of conventional accelerator circuits processes image data fed from an entity external to an image processing apparatus and passes the processed image data to a main memory, but some other type processes image data transferred from a main memory by DMA (direct memory access) transfer and returns the processed image data to the main memory. An accelerator circuit of the former type is incapable of processing image data stored in a main memory. Accordingly, to process both image data fed from an entity external to the image processing apparatus and image data in the main memory, two types of accelerator circuits are required to be used in parallel, which results in an increase in circuit size. In particular, an accelerator circuit serving as a 2D filter has a problem that as many multipliers as 2D spaces for high-speed processing are required, thereby causing a particular increase in a circuit size.

For reducing a circuit size, selecting by a selector one of image data fed from an entity external to the image processing apparatus and image data in the main memory, and feeding the selected image data to a single accelerator circuit may be performed. However, there exists a time delay since switching the selector is performed until an arithmetic operation is enabled (in a case of 2D filtering, until data is written to a 2D register). If image data fed to the accelerator circuit is frequently switched, a time delay that occurs each switching increases a period of time during which arithmetic operation of image data is not performed.

Under the circumstances, there is a need for an accelerator circuit capable of reducing an increase in a period of time during which arithmetic operation of image data is not performed and reducing a circuit size.

It is an object of the present invention to at least partially solve the problem in the conventional technology.

SUMMARY OF THE INVENTION

It is an object of the present invention to at least partially solve the problems in the conventional technology.

There is provided an accelerator circuit for an image processing apparatus, the accelerator circuit includes a buffer circuit configured to obtain image data from N data sources, N being a number greater than one, and temporarily store the image data; and an arithmetic circuit configured to perform a predetermined arithmetic operation on pixel data, the pixel data being a part of image data obtained from one of the N data sources, of an area of a predetermined size, the buffer circuit including N buffer memories and N 2D registers, the N being the number greater than one, associated with the respective N data sources, a control circuit, and a selector, wherein each of the buffer memories is configured to temporarily store image data obtained from a corresponding one of the N data sources, each of the 2D registers is configured to temporarily store pixel data, the pixel data being a part of image data stored in a corresponding one of the N buffer memories, of the area of the predetermined size, the selector is configured to select pixel data stored in one of the N 2D registers and send the selected pixel data to the arithmetic circuit under control of the control circuit, and the control circuit is configured to control the selector so as to send, when pixel data is stored in one of the N 2D registers, the pixel data to the arithmetic circuit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

First Embodiment

Figure 1:
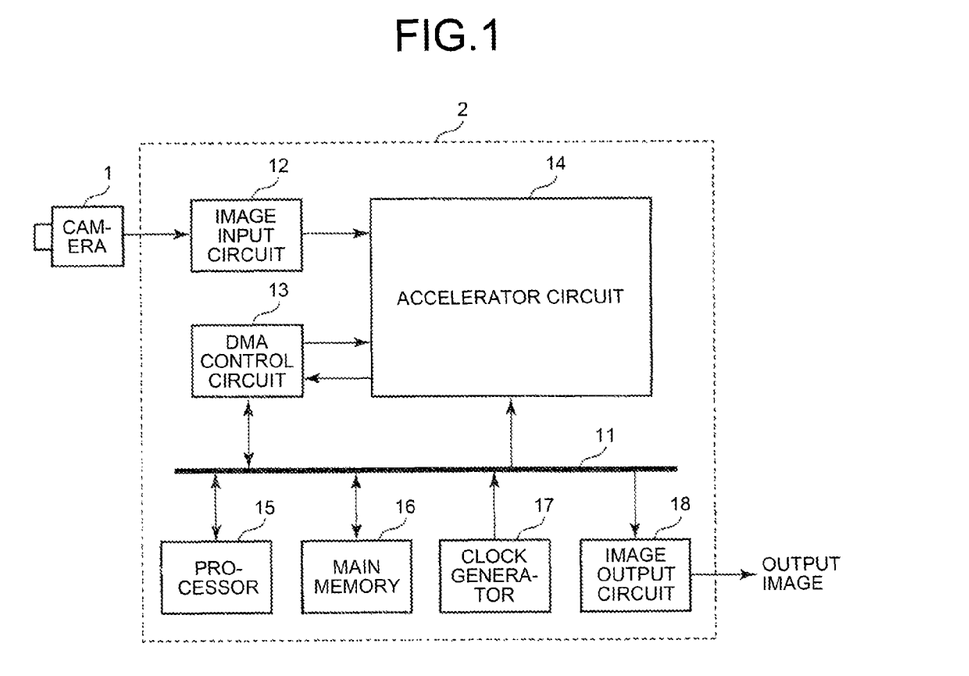
FIG. 1 is a block diagram illustrating a configuration of an image processing apparatus 2 according to a first embodiment of the present invention.

FIG. 1 is a block diagram illustrating a configuration of an image processing apparatus 2 according to a first embodiment of the present invention. The image processing apparatus 2 obtains an image captured by an external camera 1, processes the image, and outputs the thus-processed image (output image). The image processing apparatus 2 includes a bus 11, an image input circuit 12, a DMA control circuit 13, an accelerator circuit 14, a processor 15, a main memory 16, a clock generator 17, and an image output circuit 18. The DMA control circuit 13, the accelerator circuit 14, the processor 15, the main memory 16, the clock generator 17, and the image output circuit 18 are connected to each other via the bus 11. The clock generator 17 generates a clock CLK and supplies the clock CLK to other constituents. The image input circuit 12 inputs image data obtained from an entity (the camera 1) external to the image processing apparatus 2 to the accelerator circuit 14 as first image data. The DMA control circuit 13 transfers image data stored in the main memory 16 to the accelerator circuit 14 as second image data using DMA transfer. The accelerator circuit 14 performs, for example, a two-dimensional (hereinafter, "2D") filtering operation. The accelerator circuit 14 processes image data fed from the image input circuit 12 and sends the thus-processed image data to the main memory 16. The accelerator circuit 14 also processes image data transferred from the main memory 16 using DMA transfer and returns the thus-processed image data to the main memory 16. The image data processed by the accelerator circuit 14 is also transferred to the main memory 16 by the DMA control circuit 13 using DMA transfer. The processor 15 controls the accelerator circuit 14 and processes image data in the main memory 16 using software. The image data processed by the processor 15 is eventually output from the image output circuit 18 as an output image.

An accelerator circuit according to a comparative example is described below with reference to FIGS. 4 and 5.

Figure 4:
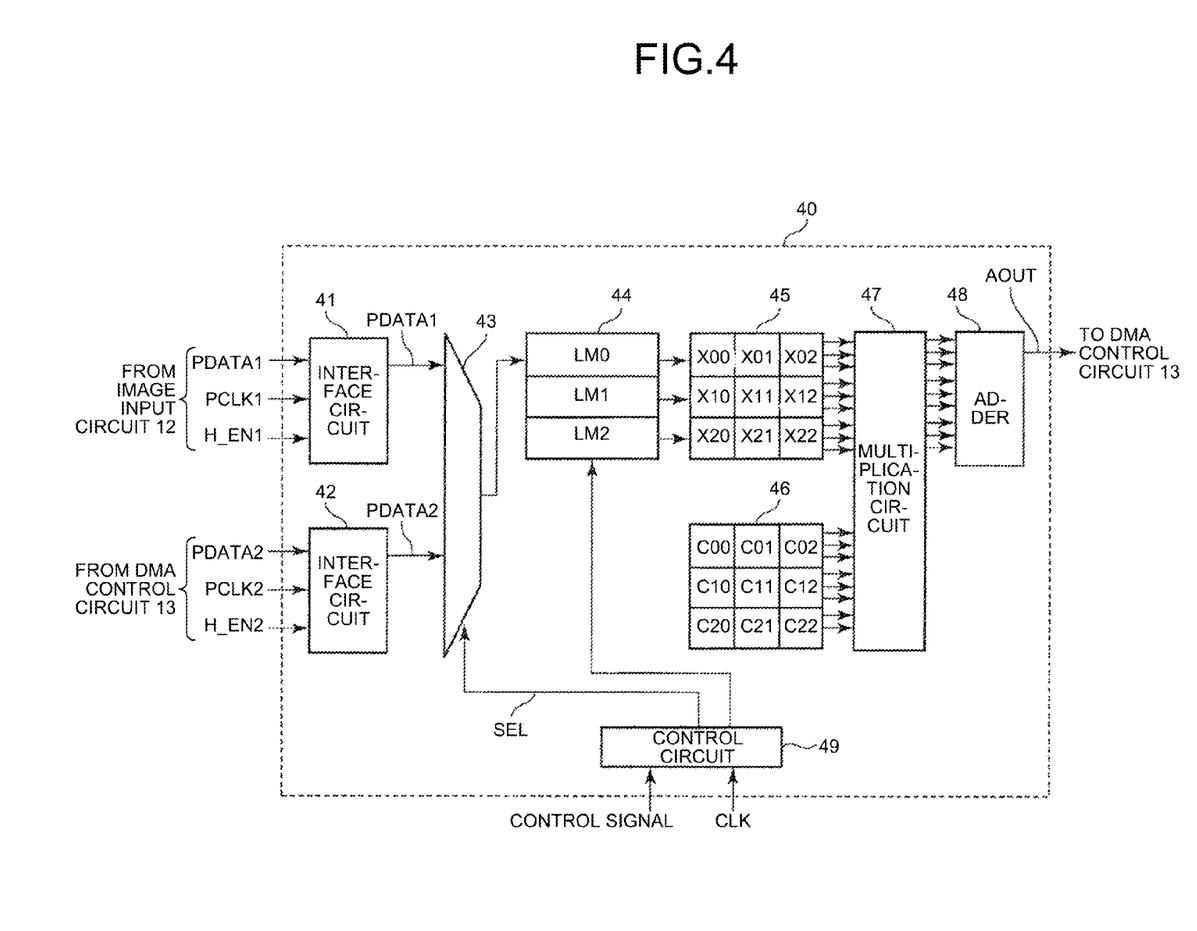
FIG. 4 is a block diagram illustrating a detailed configuration of an accelerator circuit 40 according to a comparative example.

FIG. 4 is a block diagram illustrating a detailed configuration of an accelerator circuit 40 according to a comparative example. Assume that the image processing apparatus 2 illustrated in FIG. 1 includes the accelerator circuit 40 illustrated in FIG. 4 in lieu of the accelerator circuit 14. The accelerator circuit 40 illustrated in FIG. 4 includes interface circuits 41 and 42, a selector 43, a buffer memory 44, 2D registers 45 and 46, a multiplication circuit 47, an adder 48, and a control circuit 49. The accelerator circuit 40 performs a 2D filtering operation on pixel data of an area of a predetermined size (3×3) in the image data.

A control signal from the processor 15 and the clock CLK from the clock generator 17 are fed to the control circuit 49. The interface circuit 41 receives image data PDATA1, a clock PCLK1, and an enable signal H_EN1 from the image input circuit 12. The image data PDATA1 is image data obtained by the camera 1. The clock PCLK1 is a clock of the camera 1. The enable signal H_EN1 indicates that horizontal data of the image data PDATA1 is valid. The interface circuit 42 receives image data PDATA2, a clock PCLK2, and an enable signal H_EN2 from the DMA control circuit 13. The image data PDATA2 is image data transferred from the main memory 16 using DMA transfer. The clock PCLK2 is a clock CLK generated by the clock generator 17. The enable signal H_EN2 indicates that horizontal data of the image data PDATA2 is valid. The selector 43 selects either the image data PDATA1 or the image data PDATA2 and sends the selected image data to the buffer memory 44 in accordance with a select signal SEL fed from the control circuit 49. The buffer memory 44 includes a plurality of (e.g., three) line memories LM0 through LM2 and temporarily stores the selected image data. More specifically, a 2D filtering operation on pixels on one line of the image data involves pixels on the immediately preceding line and the immediately succeeding line. Accordingly, the buffer memory 44 stores pixel data of the three lines in the line memories LM0 through LM2. When the pixel data of the three lines has been stored, the pixel data is transferred from the line memories LM0 through LM2 to the 2D register 45 to form a 3×3 area. The 2D register 45 temporarily stores pixel data Xij ($0 \leq i, j \leq 2$) of the 3×3 area, which is a part of the image data stored in the buffer memory 44. The 2D register 46 stores 3×3 arithmetic parameters Cij ($0 \leq i, j \leq 2$) for the 2D filtering operation in advance. The multiplication circuit 47 includes nine multipliers. The multiplication circuit 47 and the adder 48 perform a following arithmetic operation using the pixel data Xij and the arithmetic parameters Cij and outputs processed image data AOUT which is a result of the arithmetic operation.

$$AOUT = \sum_{i=0}^{2} \sum_{j=0}^{2} Xij \times Cij \qquad (1)$$

Figure 5:
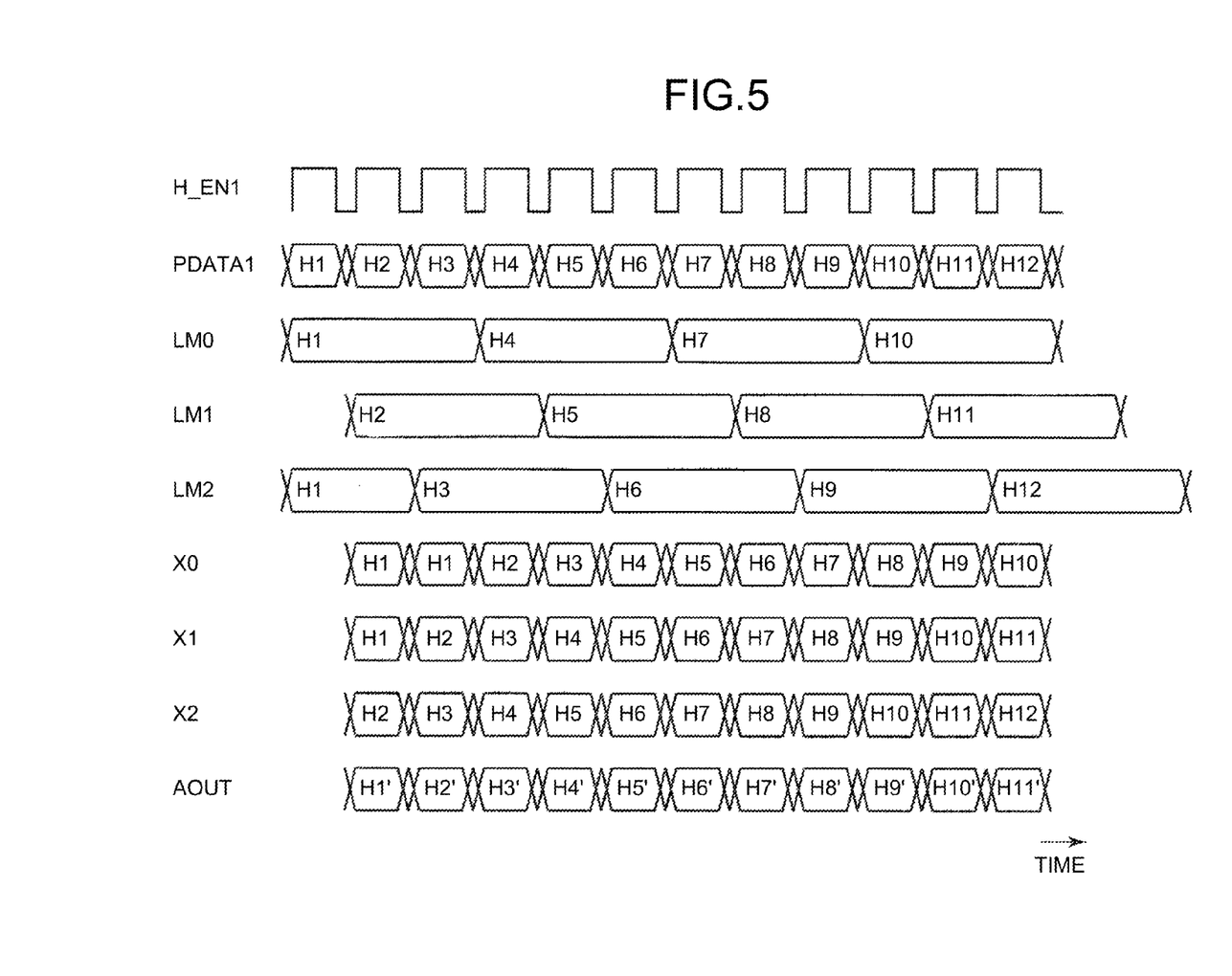
FIG. 5 is a timing chart illustrating how the accelerator circuit 40 illustrated in FIG. 4 operates.

FIG. 5 is a timing chart illustrating how the accelerator circuit 40 illustrated in FIG. 4 operates. When the enable signal H_EN1 is low, the image data PDATA1 is undefined. Pixel data H1 on the first line is stored in the line memories LM0 and LM2. The reason why the pixel data H1 is stored also in the line memory LM2 is to speed up to fill the 3×3 area of the 2D register 45 with the image data without unnaturalness. Pixel data H2 on the second line is stored in the line memory LM1. Simultaneously therewith, the pixel data stored in the line memories LM0 through LM2 is sent to the 2D register 45 to form the pixel data Xij of the 3×3 area in the 2D register 45. Thereafter, the arithmetic operation given by Equation (1) is performed using the pixel data Xij and the arithmetic parameters Cij. Data H1', which is a result of the arithmetic operation, is output as the processed image data AOUT.

As can be seen from FIG. 5, the accelerator circuit 40 of the comparative example has a time delay since image data is fed to the accelerator circuit 40 until processed image data is output that corresponds to one line at minimum. For this reason, even if switching using the selector 43 is performed during processing of one of the image data (the image data PDATA1) to select the other one of the image data (the image data PDATA2), for example, processing of the image data PDATA2 cannot be started until completion of processing of the image data PDATA1. Hence, there arises the necessity of withholding feeding the image data PDATA2 until the image data AOUT, which is a result of processing performed on the image data PDATA1, is output. Therefore, even if the accelerator circuit 40 includes the selector 43 as illustrated in FIG. 4, it has been substantially impracticable to process image data fed from an entity external to the image processing apparatus and image data in the main memory by switching therebetween in a time-division manner.

The accelerator circuit 14 according to the first embodiment is described below with reference to FIGS. 2 and 3.

Figure 2:
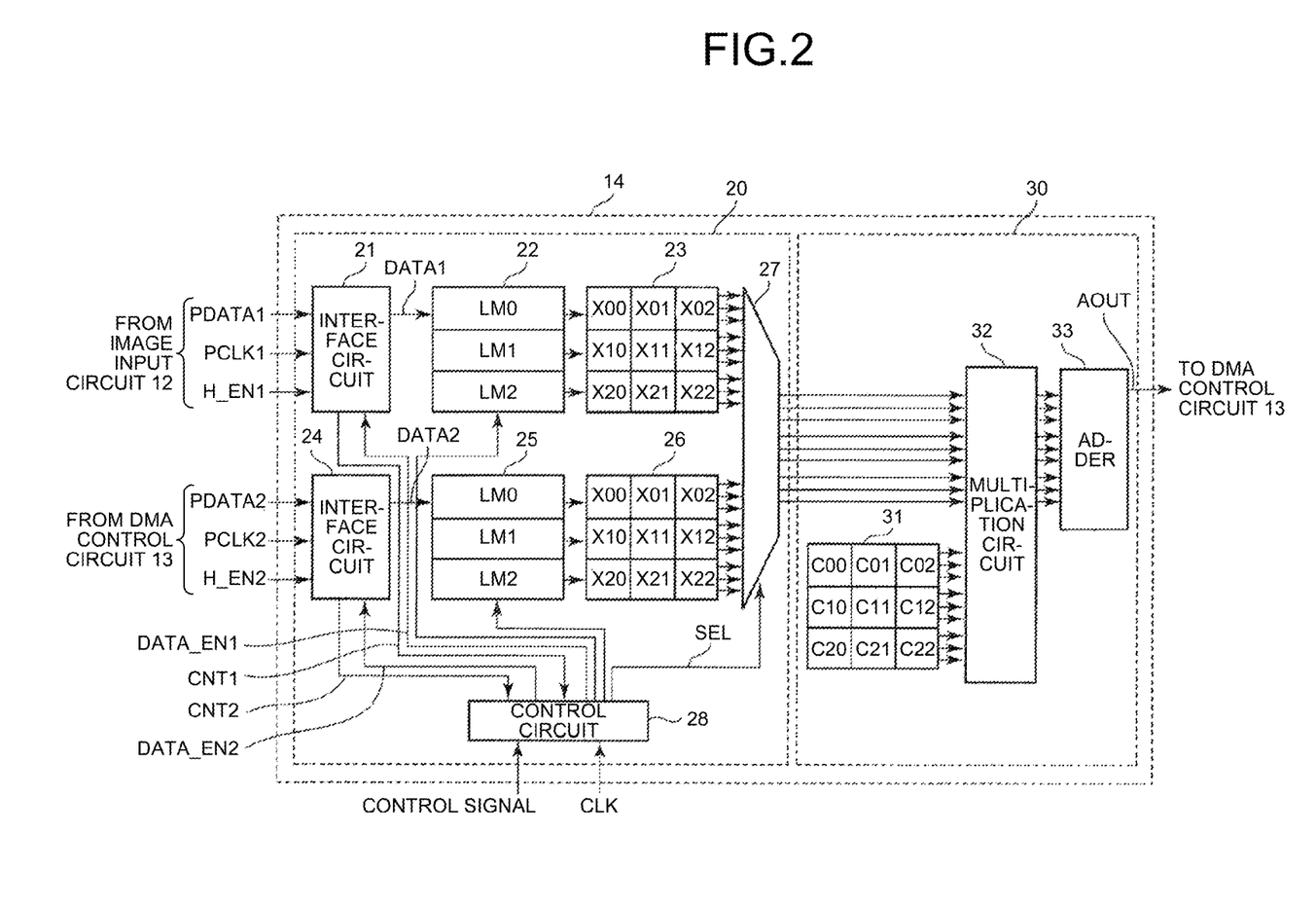
FIG. 2 is a block diagram illustrating a detailed configuration of an accelerator circuit 14 illustrated in FIG. 1.

FIG. 2 is a block diagram illustrating a detailed configuration of the accelerator circuit 14 illustrated in FIG. 1. The accelerator circuit 14 includes a buffer circuit 20 and an arithmetic circuit 30. The buffer circuit 20 obtains the first image data sent from the image input circuit 12 and the second image data transferred by the DMA control circuit 13 and temporarily stores the first and second image data. The arithmetic circuit 30 performs a 2D filtering operation on pixel data, which is a part of the first or second image data, of an area of a predetermined size (3×3).

The buffer circuit 20 includes interface circuits 21 and 24, buffer memories 22 and 25, 2D registers 23 and 26, a selector 27, and a control circuit 28. A control signal from the processor 15 and the clock CLK from the clock generator 17 are fed to the control circuit 28. The control circuit 28 sends enable signals DATA_EN1 and DATA_EN2 to the interface circuits 21 and 24, respectively, and sends the select signal SEL to the selector 27.

The interface circuit 21 receives the image data PDATA1, the clock PCLK1, and the enable signal H_EN1 from the image input circuit 12. The enable signal DATA_EN1 indicates that the image data PDATA1 is valid. The interface circuit 21 retrieves the image data PDATA1 when the enable signal DATA_EN1 is high, increments a count signal CNT1 by one, and sends the count signal CNT1 to the control circuit 28. The count signal CNT1 indicates how many times the interface circuit 21 has performed retrieval. The interface circuit 21 generates image data DATA1 by re-retrieving the retrieved image data PDATA1 in synchronization with the clock CLK, and sends the image data DATA1 to the buffer memory 22. The buffer memory 22 includes the plurality of (e.g., three) line memories LM0 through LM2 and temporarily stores the image data DATA1. The control circuit 28 manages write addresses for the line memories of the buffer memory 22 using the count signal CNT1. The 2D register 23 temporarily stores the pixel data Xij (0≤i, j≤2), which is a part of the image data stored in the buffer memory 22, of the area of the predetermined size (3×3).

The interface circuit 24 receives the image data PDATA2, the clock PCLK2, and the enable signal H_EN2 from the DMA control circuit 13. The enable signal DATA_EN2 indicates that the image data PDATA2 is valid. The interface circuit 24 retrieves the image data PDATA2 when the enable signal DATA_EN2 is high, increments a count signal CNT2 by one, and sends the count signal CNT2 to the control circuit 28. The count signal CNT2 indicates how many times the interface circuit 24 has performed retrieval. The interface circuit 24 generates image data DATA2 by re-retrieving the retrieved image data PDATA2 in synchronization with the clock CLK, and sends the image data DATA2 to the buffer memory 25. The buffer memory 25 includes the plurality of (e.g., three) line memories LM0 through LM2 and temporarily stores the image data DATA2. The control circuit 28 manages write addresses for the line memories of the buffer memory 25 using the count signal CNT2. The 2D register 26 temporarily stores the pixel data Xij (0≤i, j≤2), which is a part of the image data stored in the buffer memory 25, of the area of the predetermined size (3×3).

Each of the buffer memories 22 and 25 does not necessarily include the three line memories (LM0 through LM2). Alternatively, the buffer memory 22, 25 may include line memories the number of which is equal to or smaller than the number of the rows of the 2D register 23, 26.

The selector 27 selects one of first pixel data and second pixel data and sends the selected pixel data to the arithmetic circuit 30 in accordance with the select signal SEL fed from the control circuit 28. The control circuit 28 controls the selector 27 so as to send, only when pixel data is stored in all the elements of the 2D register 23, the pixel data to the arithmetic circuit 30. The control circuit 28 controls the selector 27 so as to send, only when pixel data is stored in all the elements of the 2D register 26, the pixel data to the arithmetic circuit 30.

The arithmetic circuit 30 includes a 2D register 31, a multiplication circuit 32, and an adder 33. The 2D register 31 stores the 3×3 arithmetic parameters Cij (0≤i, j≤2) for the 2D filtering in advance. The multiplication circuit 32 includes nine multipliers. The multiplication circuit 32 and the adder 33 perform the arithmetic operation given by Equation (1) using the pixel data Xij and the arithmetic parameters Cij and outputs a result of the arithmetic operation as the processed image data AOUT.

As described above, the buffer circuit 20 includes the buffer memories 22 and 25 and the 2D registers 23 and 26 for temporarily storing the first and second image data. This configuration allows reducing a time delay since switching the selector 27 is performed until input image data is processed and output. Accordingly, image data fed from an entity external to the image processing apparatus 2 and image data in the main memory 16 can be processed by switching therebetween in a time-division manner.

The selector 27 is controlled so as to send, only when pixel data is stored in all the elements of the 2D register 23, the pixel data to the arithmetic circuit 30. The selector 27 is also controlled so as to send, only when pixel data is stored in all the elements of the 2D register 26, the pixel data to the arithmetic circuit 30. Accordingly, a time delay since switching the selector 27 is performed until processed image data is output is reduced only to a time delay caused by the multiplication circuit 32 and the adder 33. As a result, image data processing can be completed in several clocks.

In an example case where a rate of data transfer from the camera 1 to the image processing apparatus 2 is half that in the image processing apparatus 2, utilization rate of the accelerator circuit 14 is as low as approximately 50% even during a valid data period. Utilization rate of the accelerator circuit 14 is still lower than this due to horizontal blanking and vertical blanking periods. In this case, both of image data fed from an entity external to the image processing apparatus 2 and image data in the main memory 16 can be processed by controlling the selector 27 so that any one of the externally-fed image data and the image data in the main memory 16 is processed.

Figure 3:
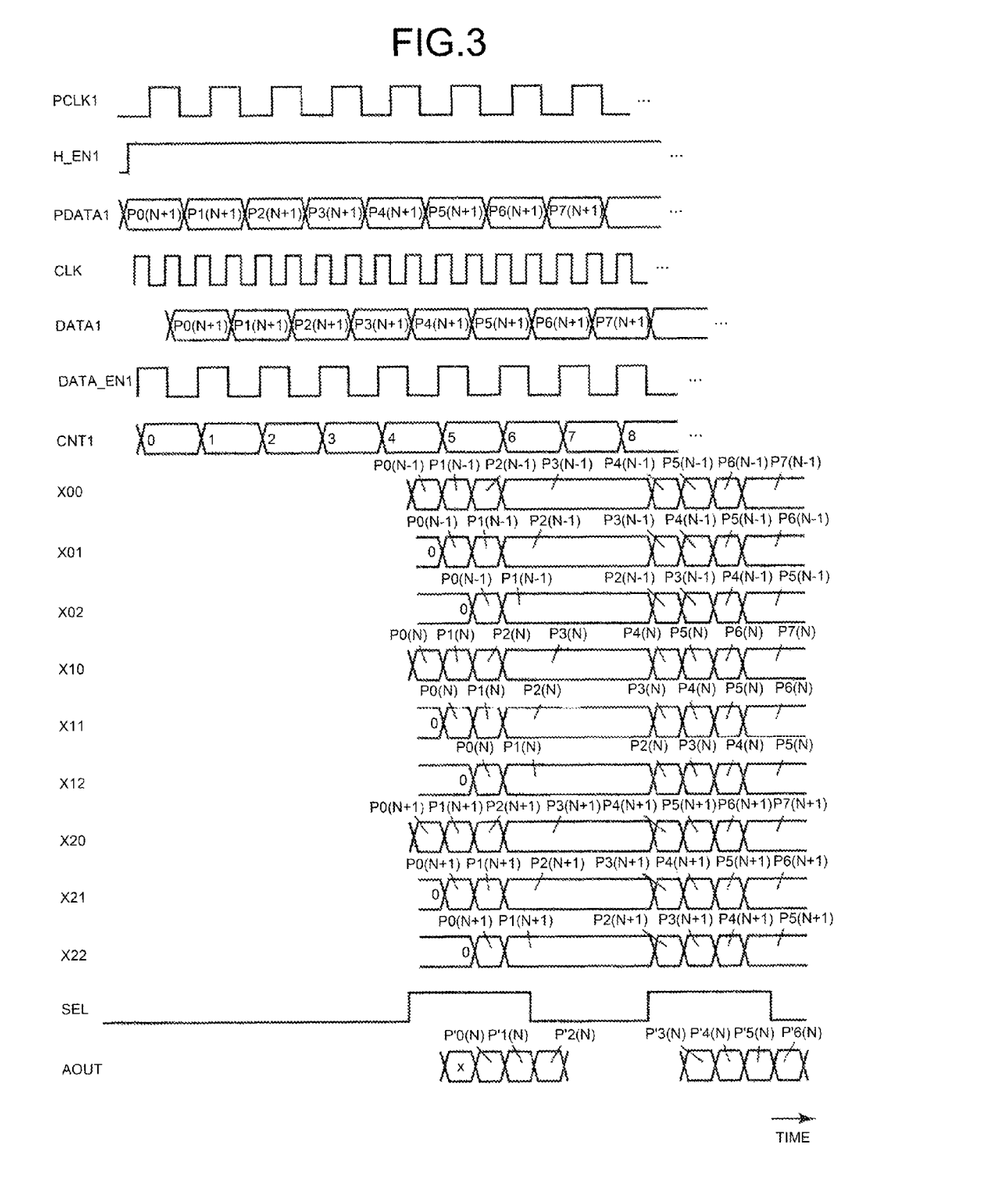
FIG. 3 is a timing chart illustrating how the accelerator circuit 14 illustrated in FIG. 2 operates.

FIG. 3 is a timing chart illustrating how the accelerator circuit 14 illustrated in FIG. 2 operates. Operation of the accelerator circuit 14 is specifically described below in clock units with reference to the timing chart illustrated in FIG. 3. Assume that, for example, the rate of the clock PCLK1 of the camera 1 and the rate of the image data PDATA1 are half the rate of the clock CLK of the image processing apparatus 2. The interface circuit 21 generates the image data DATA1 by re-retrieving the retrieved image data PDATA1 in synchronization with the clock CLK, and sends the image data DATA1 to the buffer memory 22. In FIG. 3, pixel data contained in the image data PDATA1 and the image data DATA1 is indicated by "Pm(n)", where "m" is the number in the horizontal direction of the pixel data, "n" is the line number. "N" is the line number of a line containing pixel data on which the arithmetic operation is to be performed. A 3×3 2D filtering operation requires pixel data of three lines. More specifically, the 3×3 2D filtering operation can be performed on pixel data on the Nth line when all pixel data on the (N−1)th, the Nth, and the (N+1)th lines are provided. In FIG. 3, only pixel data on the (N+1)th line of the image data PDATA1 and that of the image data DATA1 are depicted for brevity of illustration. Pixel data of the image data DATA1 stored in the buffer memory 22 is stored in the 2D register 23 in units of four sections (P0(N+1) to P3(N+1), P4(N+1) to P7(N+1), . . . ). Elements X00, X01, and X02 of the 2D register 23 make up a shift register which operates in such a manner that when new image data is input to the element X00, previously-stored data is shifted to the elements X01 and X02. Similarly, elements X10, X11, and X12 of the 2D register 23 make up a shift register which operates in such a manner that when new image data is input to the element X10, previously-stored data is shifted to the elements X11 and X12. Similarly, elements X20, X21, and X22 of the 2D register 23 make up a shift register which operates in such a manner that when new image data is input to the element X20, previously-stored data is shifted to the elements X21 and X22. When pixel data is stored in all the elements of the 2D register 23, the control circuit 28 sets the select signal SEL high, thereby causing the pixel data to be transferred to the arithmetic circuit 30. For brevity of description, it is assumed that multiplication and addition are completed in one clock. In this case, the processed image data AOUT is output in one clock after the pixel data stored in the 2D register 23 is selected by the selector 27. Accordingly, the accelerator circuit 14 can process the image data PDATA2 transferred from the main memory 16 during a period when the select signal SEL is low.

In the accelerator circuit 14 of the first embodiment, the selector 27 is controlled so as to send, only when pixel data is stored in all the elements of the 2D register 23 or 26, the pixel data to the arithmetic circuit 30. Accordingly, a time delay since switching the selector 27 is performed until processed image data is output can be reduced only to a time delay caused by the multiplication circuit 32 and the adder 33. Hence, a time delay since switching the selector 27 is performed until processed image data is output is reduced to be considerably small. As a result, image data fed from an entity external to the image processing apparatus 2 and image data in the main memory 16 can be processed by switching therebetween in a time-division manner.

Because the accelerator circuit 40 of the comparative example requires that pixel data should be stored in the buffer memory 44 and the 2D register 45 in the period since switching the selector 43 is performed until a arithmetic operation is enabled, a large time delay occurs. By contrast, in the accelerator circuit 14 of the first embodiment, switching using the selector 27 is performed only when pixel data is stored in all the elements of the 2D register 23 or 26. Accordingly, any other time delay rather than a time delay due to multiplication, addition, and the like does not occur.

The accelerator circuit 14 according to the first embodiment allows reducing circuit size while reducing an increase in a period of time during which arithmetic operation of image data is not performed.

The accelerator circuit 14 illustrated in FIG. 1 includes two data sources (the image input circuit 12 and the DMA control circuit 13). Alternatively, the accelerator circuit 14 may include three or more data sources. In this case, the accelerator circuit includes a buffer circuit that obtains image data from a plurality of (N) data sources and temporarily stores the image data and an arithmetic circuit that performs a predetermined arithmetic operation on pixel data, which is a part of image data obtained from one of the N data sources, of an area of a predetermined size. The buffer circuit includes a plurality of (N) buffer memories and a plurality of (N) 2D registers associated with the respective N data sources, a control circuit, and a selector. Each of the buffer memories temporarily stores image data obtained from a corresponding one of the N data sources. Each of the 2D registers temporarily stores pixel data, which is a part of image data stored in a corresponding one of the N buffer memories, of the area of the predetermined size. The selector selects pixel data stored in one of the N 2D registers and sends the selected pixel data to the arithmetic circuit under control of the control circuit. The control circuit controls the selector so as to send, when pixel data is stored in one of the N 2D registers, the pixel data to the arithmetic circuit.

Second Embodiment

Figure 6:
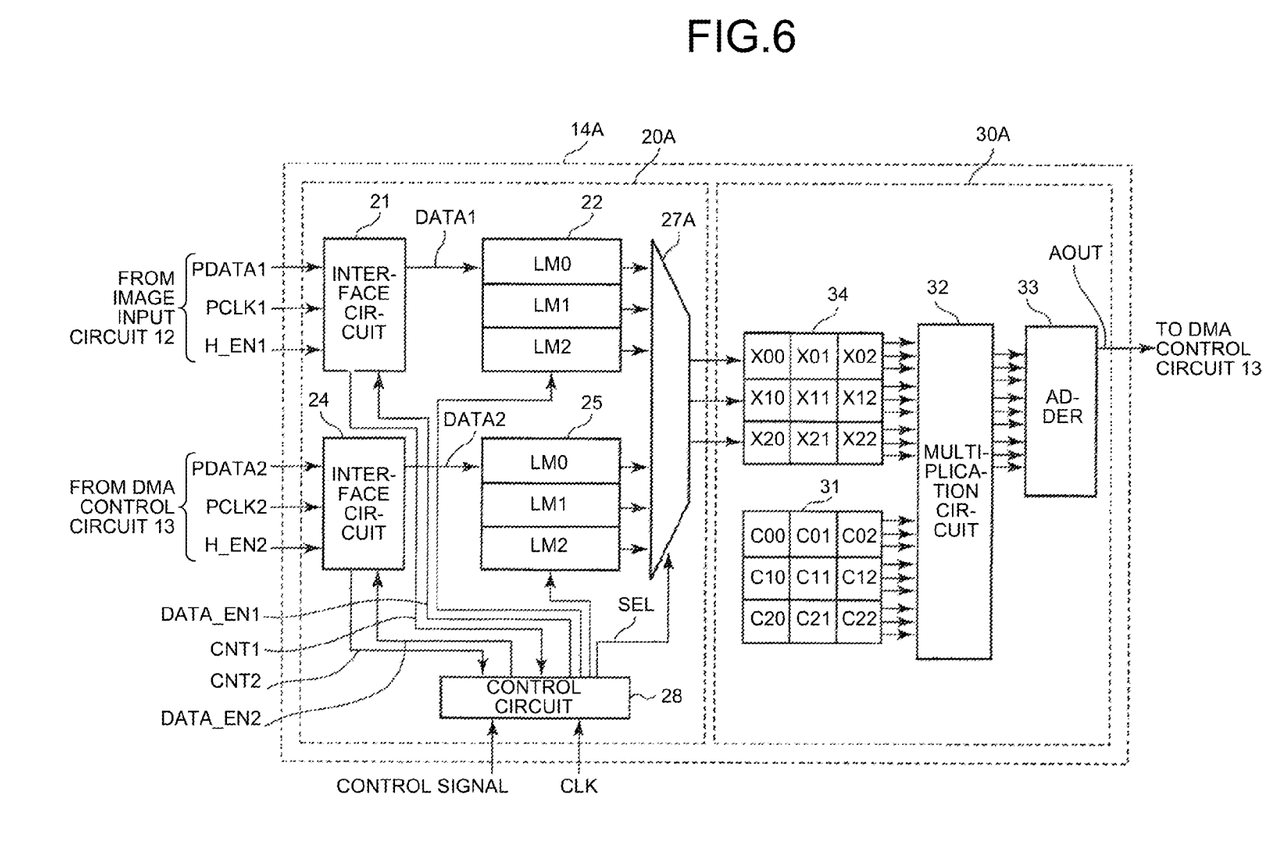
FIG. 6 is a block diagram illustrating a detailed configuration of an accelerator circuit 14A according to a second embodiment of the present invention.

FIG. 6 is a block diagram illustrating a detailed configuration of an accelerator circuit 14A according to a second embodiment of the present invention. The accelerator circuit 14A illustrated in FIG. 6 includes a buffer circuit 20A and an arithmetic circuit 30A. The accelerator circuit 14A differs from the accelerator circuit 14 in that a 2D register for storing pixel data is provided in the arithmetic circuit 30A rather than in the buffer circuit 20A.

The buffer circuit 20A includes, in lieu of the 2D registers 23 and 26 and the selector 27 illustrated in FIG. 2, a selector 27A for selecting one of first and second image data stored in the buffer memories 22 and 25, respectively, and sends the selected image data to the arithmetic circuit 30A. The arithmetic circuit 30A includes a 2D register 34 that temporarily stores pixel data, which is a part of the first or second image data sent from the buffer circuit 20A, of an area of a predetermined size. The control circuit 28 controls the selector 27A so as to send, only when pixel data of the first image data is stored in the buffer memory 22, the pixel data of the first image data to the arithmetic circuit 30A. The control circuit 28 controls the selector 27A so as to send, only when pixel data of the second image data is stored in the buffer memory 25, the pixel data of the second image data to the arithmetic circuit 30A.

The accelerator circuit 14A allows further reduction in circuit size as compared with the accelerator circuit 14 illustrated in FIG. 2 by virtue of including the single 2D register 34 in lieu of the two 2D registers (the 2D registers 23 and 26) illustrated in FIG. 2. However, the accelerator circuit 14A requires that image data should be stored in the 2D register 34 after switching using the selector 27A is performed. Accordingly, a time delay two clocks longer than that of the accelerator circuit 14 illustrated in FIG. 2 occurs since switching using the selector 27A is performed until processed image data is output.

The accelerator circuit 14A illustrated in FIG. 6 includes two data sources (the image input circuit 12 and the DMA control circuit 13). Alternatively, the accelerator circuit 14A may include three or more data sources. In this case, the accelerator circuit includes a buffer circuit that obtains image data from a plurality of (N) data sources and temporarily stores therein the image data and an arithmetic circuit that performs a predetermined arithmetic operation on pixel data, which is a part of image data obtained from one of the N data sources, of an area of a predetermined size. The buffer circuit preferably includes a plurality of (N) buffer memories associated with the N data sources, a control circuit, and a selector. Each of the buffer memories temporarily stores image data obtained from a corresponding one of the N data sources. The selector selects image data stored in one of the N buffer memories and sends the selected image data to the arithmetic circuit under control of the control circuit. The arithmetic circuit includes a 2D register that temporarily stores pixel data, which is a part of the image data sent from the buffer circuit, of the area of the predetermined size. The control circuit controls the selector so as to send, only when pixel data is stored in one of the N buffer memories, the pixel data to the arithmetic circuit.

Modifications

Each of the accelerator circuits 14 and 14A illustrated in FIGS. 2 and 6, respectively, may be used, as the buffer memory 22, 25, a frame memory or a memory that stores a part of a frame in lieu of the line memories. Each of the accelerator circuits 14 and 14A illustrated in FIGS. 2 and 6, respectively, may be used a shift register, a lookup table, or the like as the 2D register 23, 26, 34.

The control circuit 28 may be configured to rewrite the arithmetic parameters stored in the 2D register 31 under control of the processor 15.

Arithmetic operation to be performed by the accelerator circuit 14, 14A is not limited to the 2D filtering operation; the accelerator circuit 14, 14A may alternatively be configured to perform other desired image processing such as labeling, contour tracking, and/or pattern matching that uses a 2D operator. In this case, the buffer circuit 20, 20A may be configured as in FIG. 2, FIG. 6; however, the arithmetic circuit 30, 30A includes, in addition to the multiplication circuit and the adder, a determination circuit.

An accelerator circuit according to an aspect of the present invention and an image processing apparatus according to an aspect of the invention are configured as follows.

An accelerator circuit according to an aspect of the present invention allows reducing an increase in a period of time during which arithmetic operation of image data is disabled while being reduced in circuit size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An accelerator circuit for an image processing apparatus, the accelerator circuit comprising:
a buffer circuit configured to obtain image data from N data sources and temporarily store the image data, N being a number greater than one; and
an arithmetic circuit;
the buffer circuit including
N buffer memories and N two-dimensional (2D) registers corresponding, respectively, to the N data sources,
a control circuit, and
a selector, wherein
each of the N buffer memories is configured to temporarily store image data obtained from a corresponding one of the N data sources,
each of the N 2D registers is configured to temporarily store pixel data that is of an area of a first size and is a part of image data stored in a corresponding one of the N buffer memories,
the selector is configured to select pixel data of the first size stored in one of the N 2D registers and send the selected pixel data to the arithmetic circuit under control of the control circuit,
the arithmetic unit is configured to perform a first arithmetic operation on the selected pixel data of the first size, and
the control circuit is configured to control the selector to perform the sending when pixel data is stored in one of the N 2D registers.

2. The accelerator circuit according to claim 1, wherein each of the N buffer memories includes line memories a number of which is equal to or smaller than a number of rows in a 2D register from among the N 2D registers.

3. An accelerator circuit for an image processing apparatus, the accelerator circuit comprising:
a buffer circuit configured to obtain image data from N data sources and temporarily store the image data, N being a number greater than one;
an arithmetic circuit;
the buffer circuit including
N buffer memories corresponding, respectively, to the N data sources,
a control circuit, and
a selector, wherein
each of the N buffer memories is configured to temporarily store image data obtained from a corresponding one of the N data sources,
the selector is configured to select image data stored in one of the N buffer memories and send the selected image data to the arithmetic circuit under control of the control circuit,
the arithmetic unit is configured to perform a first arithmetic operation on pixel data of a first size, the pixel data being part of the selected image data,
the arithmetic circuit includes a two-dimensional (2D) register that is configured to temporarily stores pixel data of the first size, and
the control circuit is configured to control the selector to perform the sending when pixel data is stored in one of the N buffer memories.

4. The accelerator circuit according to claim 3, wherein each of the N buffer memories includes line memories a number of which is equal to or smaller than a number of rows in the 2D register.

5. An image processing apparatus comprising:
a processor;
a main memory;
the accelerator circuit according to claim 1;
an image input circuit configured to feed image data obtained from an entity external to the image processing apparatus to the accelerator circuit as first image data; and a DMA control circuit configured to transfer image data in the main memory to the accelerator circuit as second image data.

6. An accelerator circuit for an image processing apparatus, the accelerator circuit comprising:
   a buffer circuit configured to obtain image data from N data sources and temporarily store the image data, N being a number greater than one;
   an arithmetic circuit;
   the buffer circuit including
      a plurality of buffer memories, the plurality of buffer memories including at least N buffer memories that correspond, respectively, to the N data sources, and
      a selector, wherein
   each of the N buffer memories is configured to temporarily store image data obtained from a corresponding one of the N data sources,
   the selector is configured to select image data that has been stored in one of the N buffer memories and send the selected image data to the arithmetic circuit, and
   the arithmetic unit is configured to perform a first arithmetic operation on pixel data of a first size, the pixel data being part of the selected image data.

7. The accelerator circuit of claim 6, wherein,
   the buffer circuit further includes a plurality of two-dimensional (2D) registers, the plurality of 2D registers including at least N 2D registers that correspond, respectively, to the N buffer memories,
   the N 2D registers are each configured to receive the image data temporarily stored in corresponding buffer memories, from among the N buffer memories, and
   the selector is configured such that the selected image data selected by the selector is image data stored in one of the N 2D registers.

8. The accelerator circuit of claim 7, further comprising:
   a control circuit;
   the control circuit being configured to control the selector to perform the sending when pixel data is stored in one of the N 2D registers.

9. The accelerator circuit of claim 6, wherein the arithmetic circuit includes a two-dimensional (2D) register that is configured to temporarily store pixel data of the first size.

10. The accelerator circuit of claim 9, further comprising:
   a control circuit;
   the control circuit being configured to control the selector to perform the sending when pixel data is stored in one of the N buffer memories.

* * * * *